United States Patent
Ast et al.

(10) Patent No.: US 8,664,813 B2
(45) Date of Patent: Mar. 4, 2014

(54) PHASE RING ASSEMBLY

(75) Inventors: Jean Charles Ast, Belfort (FR); Marc Zimmermann, Saint Germain (FR)

(73) Assignee: Alstom Technology Ltd., Baden (CH)

(*) Notice: Subject to any disclaimer, the term of this patent is extended or adjusted under 35 U.S.C. 154(b) by 174 days.

(21) Appl. No.: 13/190,960

(22) Filed: Jul. 26, 2011

(65) Prior Publication Data

US 2012/0194016 A1  Aug. 2, 2012

(30) Foreign Application Priority Data

Jul. 27, 2010  (EP) .................................. 10305829

(51) Int. Cl.
*H02K 11/00* (2006.01)

(52) U.S. Cl.
USPC ............................................ 310/71; 310/260

(58) Field of Classification Search
USPC ..................................................... 310/71, 260
See application file for complete search history.

(56) References Cited

U.S. PATENT DOCUMENTS

| | | | |
|---|---|---|---|
| 3,675,058 A * | 7/1972 | Beddows et al. ............... | 310/71 |
| 5,900,687 A | 5/1999 | Kondo et al. | |
| 6,914,356 B2 * | 7/2005 | Yamamura et al. ............... | 310/71 |
| 8,373,321 B2 * | 2/2013 | Lee et al. ............... | 310/71 |
| 2007/0052307 A1 | 3/2007 | Yoshida et al. | |
| 2009/0256439 A1 | 10/2009 | Inoue et al. | |
| 2010/0109456 A1 | 5/2010 | Sugiyama et al. | |
| 2010/0109457 A1 * | 5/2010 | Sugiyama et al. ............... | 310/71 |

FOREIGN PATENT DOCUMENTS

| | | |
|---|---|---|
| DE | 103 18 816 A1 | 11/2004 |
| EP | 0 863 601 B1 | 9/2000 |
| EP | 2 110 925 A1 | 10/2009 |
| EP | 2 182 614 A2 | 5/2010 |

OTHER PUBLICATIONS

European Search Report dated Dec. 17, 2010.
Communication Pursuant to Article 94(3) EPC dated Jan. 21, 2013 issued by the European Patent Office in corresponding European Patent Application No. 10 305 829.3.

* cited by examiner

*Primary Examiner* — Dang Le
(74) *Attorney, Agent, or Firm* — Buchanan Ingersoll & Rooney PC

(57) ABSTRACT

The phase ring assembly includes a support ring carrying a plurality of phase rings provided with connection arms that are bent to the phase rings. The connection arms are placed between the phase rings and the support ring. The support ring has recessed seats housing the connection arms.

8 Claims, 2 Drawing Sheets

PHASE RING ASSEMBLY

RELATED APPLICATION

This application claims priority under 35 U.S.C. §119 to European Patent Application No. 10305829.3 filed in Europe on Jul. 27, 2010, the entire content of which is hereby incorporated by reference in its entirety.

FIELD

The present disclosure relates to a phase ring assembly such as a phase ring assembly of an electric generator.

BACKGROUND INFORMATION

Electric generators are known to include a stator provided with stator windings and a rotor also provided with rotor windings.

As shown in FIG. 2, the stator windings are connected to a phase ring assembly 1 that includes a support ring 2 that carries a plurality of phase rings 3. The phases of the electric generator are connected to the phase rings 3 in several parts. For example, the phase rings 3 have connection arms 4 that are bent to them and have their ends 5 projecting from a side of the support ring 2. These ends 5 are connected to the stator windings via connectors 6.

In order to overcome the phase rings 3, the connection arms 4 lay above the same phase rings 3, such that the support ring 2 carries the phase rings 3 through clamping brackets 7 and, in addition, also the connection arms 4 through clamping brackets 8 above the phase rings 3.

Nevertheless, in known configurations the zone around the support ring 2 and phase rings 3 is occupied by the connection arms 4 and their brackets 8, such that the space available for other components is substantially reduced. This reduction in space could become a problem, since this part of the generator can be very crowded.

SUMMARY

An exemplary phase ring assembly is disclosed. The phase ring assembly includes a support ring carrying a plurality of phase rings provided with connection arms that are bent to the phase rings, wherein said connection arms are placed between the phase rings and the support ring, and the support ring has recessed seats housing said connection arms.

BRIEF DESCRIPTION OF THE DRAWINGS

Further characteristics and advantages of the present disclosure will be more apparent from the description of a preferred but non-exclusive embodiment of the phase ring, illustrated by way of non-limiting example in the accompanying drawings, in which.

DETAILED DESCRIPTION

Exemplary embodiments of the present disclosure are directed to providing a phase ring assembly.

Exemplary embodiments of the present disclosure provide a phase ring assembly by which usage of the space above the support ring of the phase ring assembly is reduced. This can allow more space to be available on the support ring to include other design elements.

The phase ring assembly in exemplary embodiments of the present disclosure can allow an increased support ring thickness, such that stiffness is increased and possible vibrations can be reduced.

In addition, the heating losses are also reduced, since the connection arms are not exposed to the gas circulating within the generator.

Figure 1:
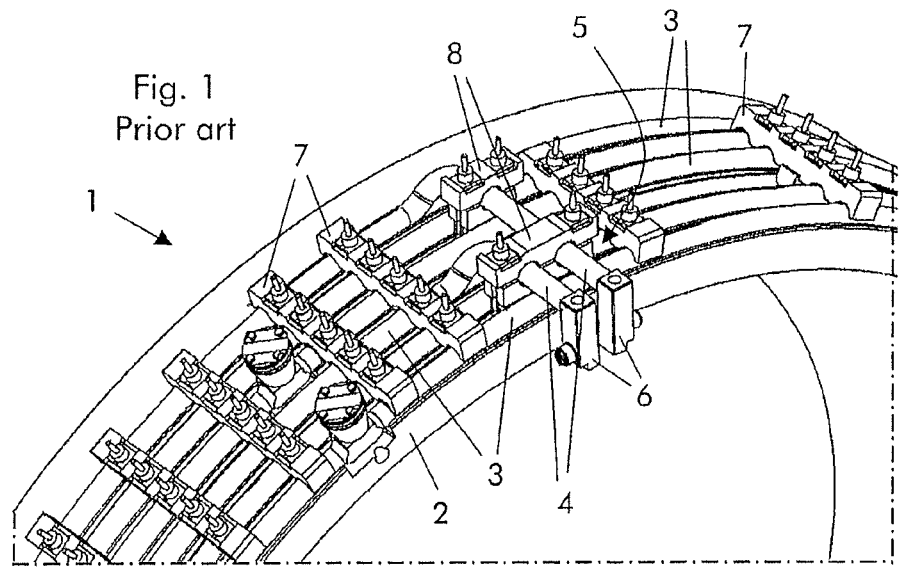
FIG. 1 illustrates a perspective view of a portion of a known phase ring.
Figure 2:
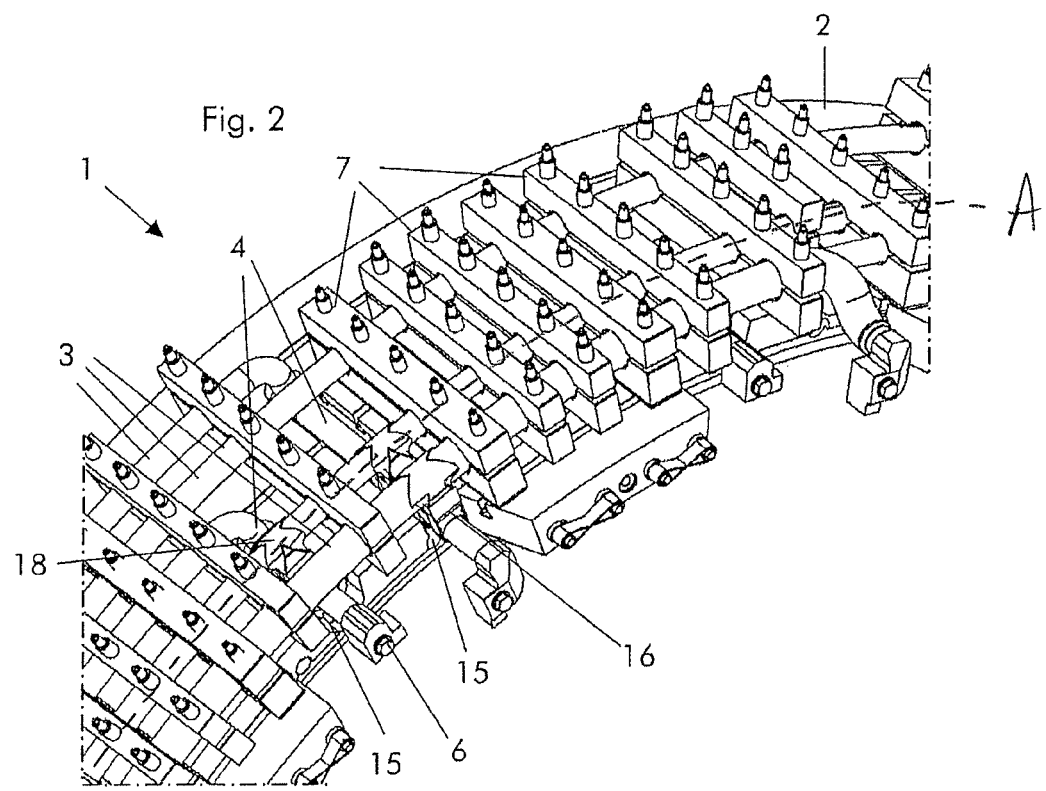
FIGS. 2 and 3 illustrate perspective views of a portion of a phase ring assembly in accordance with an exemplary embodiment as disclosed herein.
Figure 3:
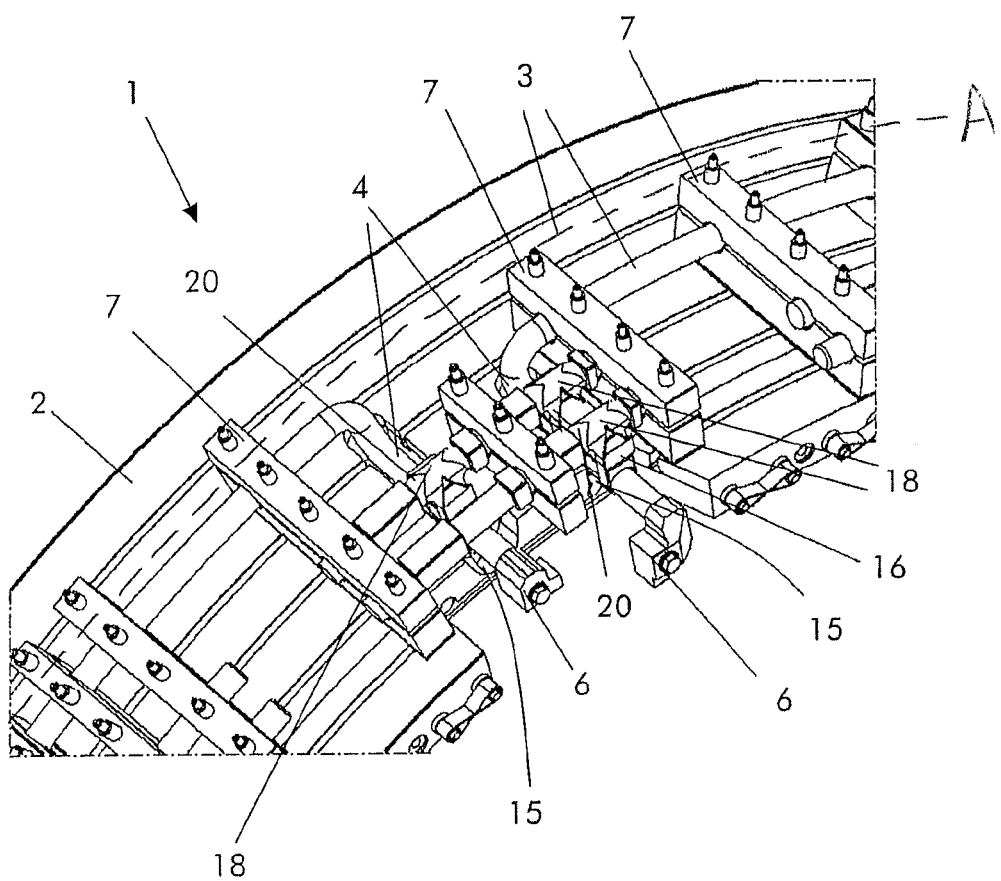

FIGS. 2 and 3 illustrate perspective views of a portion of a phase ring assembly in accordance with an exemplary embodiment. FIGS. 2 and 3 show a phase ring assembly 1 of an electric generator comprising a support ring 2 carrying a plurality of phase rings 3, having an annular sector shape, through clamping brackets 7.

The phase rings 3 can be connectable to electric generator stator windings via connection arms 4 and connectors 6.

The connection arms 4 can be bent, preferably at right angle (90 degree), to the phase rings 3 and project from it.

The connection arms 4 can be placed between the phase rings 3 and the support ring 2 in the radial direction.

The support ring 2 has recessed seats 15 housing the connection arms 4. As shown, in each recessed seat 15 only one connection arm 4 is housed.

In FIGS. 2 and 3, the connection arms 4 and the recessed seats 15 extend perpendicularly to the phase rings 3.

The connection arms 4 can be supported by one or more than one overlaying phase rings 3 depending on their position and the zone configuration.

In particular, between the connection arms 4 and the phase rings 3, spacers 16 can be provided. The spacer 16 can have concave seats for housing respectively the connection arms 4 and the phase rings 3.

Also fixing elements that include, for example, a tape 18, can be provided to connect the connection arms 4 and the phase rings 3.

In addition, since the phase rings 3 do not run over the whole circumference, bars 20 are provided. The bars 20 can be oriented to lay parallel to the phase rings 3 and arranged to support the connection arms 4 in addition to or instead of the phase rings 3.

In particular, the bars 20 like the phase rings 3 can have an annular sector shape and are supported by the clamping brackets 7 also supporting the phase rings 3.

Connection of the bars 20 to the connection arms 4 can be the same as the connection of the phase rings 3 to the connection arms 4. For this reason the connection is not explained in detail.

As a result, the features described can be independently provided from one another.

In practice the materials used and the dimensions can be chosen at will according to desired specifications and to the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBERS 1 phase ring assembly
2 support ring 3 phase rings
4 connection arms
5 ends of 4
6 connectors
7 clamping brackets of 3
8 clam ping brackets of 4
15 recessed seats of 2
16 spacer
18 tape
20 bars

What is claimed is:

1. A phase ring assembly comprising:
a support ring carrying a plurality of co-axial phase rings provided with connection arms that are bent to the phase rings, wherein said connection arms are placed between the phase rings and the support ring, the support ring has recessed seats housing said connection arms, and the connection arms extend substantially parallel to an axis of the phase rings; and
recessed seats of the support ring for housing said connection arms, wherein the connection arms are placed between the phase rings and the support ring in a radial direction.

2. The phase ring assembly of claim 1, wherein the connection arms are supported by at least one overlaying phase ring.

3. The phase ring assembly of claim 2, comprising:
spacers between the connection arms and the phase rings.

4. The phase ring assembly of claim 3, wherein the spacers have concave seats for housing respectively the connection arms and the phase rings.

5. The phase ring assembly of claim 2, comprising:
fixing elements to connect the connection arms and the phase rings.

6. The phase ring assembly of claim 5, wherein the fixing elements comprise a tape.

7. The phase ring assembly of claim 1, wherein in each recessed seat only one connection arm is housed.

8. The phase ring assembly of claim 1, wherein the phase rings have an annular sector shape.

* * * * *